United States Patent
Gabay (10) Patent No.: US 9,060,325 B2
(45) Date of Patent: Jun. 16, 2015

(54) METHOD AND APPARATUS FOR CREATING AND CONNECTING TO AN AD HOC WIRELESS CELL

(75) Inventor: Avraham Gabay, Haifa (IL)

(73) Assignee: INTEL CORPORATION, Santa Clara, CA (US)

( * ) Notice: Subject to any disclaimer, the term of this patent is extended or adjusted under 35 U.S.C. 154(b) by 1532 days.

(21) Appl. No.: 11/633,184

(22) Filed: Dec. 4, 2006

(65) Prior Publication Data

US 2008/0130530 A1 Jun. 5, 2008

(51) Int. Cl.
*H04M 7/00* (2006.01)
*H04W 48/08* (2009.01)
*H04M 1/725* (2006.01)
*H04W 84/18* (2009.01)

(52) U.S. Cl.
CPC .......... *H04W 48/08* (2013.01); *H04M 1/7253* (2013.01); *H04W 84/18* (2013.01)

(58) Field of Classification Search
CPC ............. H04W 84/18; H04W 84/20; H04W 29/08567; H04W 48/08
USPC .......... 370/310, 338, 328, 254; 455/457, 518, 455/41.2; 709/222, 223, 245, 228, 208, 709/209, 22
See application file for complete search history.

(56) References Cited

U.S. PATENT DOCUMENTS

| | | | |
|---|---|---|---|
| 6,842,460 B1 * | 1/2005 | Olkkonen et al. | 370/465 |
| 7,158,783 B2 * | 1/2007 | Eguchi | 455/420 |
| 7,359,950 B2 * | 4/2008 | Choi et al. | 709/209 |
| 7,447,178 B2 * | 11/2008 | Kim et al. | 370/331 |
| 7,616,588 B2 * | 11/2009 | Gatta et al. | 370/254 |
| 7,620,723 B2 * | 11/2009 | Chen et al. | 709/227 |
| 7,672,289 B2 * | 3/2010 | Bhatti | 370/349 |
| 7,764,929 B2 * | 7/2010 | Brethour et al. | 455/63.1 |
| 7,802,088 B2 * | 9/2010 | Jones et al. | 713/150 |
| 7,853,277 B2 * | 12/2010 | Pendergrass et al. | 455/502 |
| 8,238,308 B2 * | 8/2012 | Jeon et al. | 370/331 |
| 8,379,621 B2 * | 2/2013 | Kang et al. | 370/349 |
| 2001/0012757 A1 * | 8/2001 | Boyle | 455/11.1 |
| 2002/0055978 A1 * | 5/2002 | Joon-Bo et al. | 709/209 |
| 2003/0012219 A1 * | 1/2003 | Joo | 370/449 |
| 2003/0195019 A1 * | 10/2003 | Litwin | 455/574 |
| 2004/0170217 A1 * | 9/2004 | Ho | 375/134 |
| 2004/0258033 A1 * | 12/2004 | Heinonen et al. | 370/338 |
| 2005/0058084 A1 * | 3/2005 | Hester et al. | 370/254 |
| 2005/0129240 A1 * | 6/2005 | Balfanz et al. | 380/270 |
| 2005/0149204 A1 * | 7/2005 | Manchester et al. | 700/1 |
| 2005/0164634 A1 * | 7/2005 | Tanaka et al. | 455/41.2 |
| 2005/0188069 A1 * | 8/2005 | Mohandas | 709/223 |
| 2005/0198221 A1 * | 9/2005 | Manchester et al. | 709/220 |
| 2005/0237993 A1 * | 10/2005 | Hong et al. | 370/349 |
| 2006/0045055 A1 * | 3/2006 | Ramadas et al. | 370/338 |
| 2006/0085543 A1 * | 4/2006 | Hrastar et al. | 709/224 |
| 2006/0153156 A1 * | 7/2006 | Wentink et al. | 370/338 |
| 2006/0171388 A1 * | 8/2006 | Ikeda | 370/389 |
| 2006/0221858 A1 * | 10/2006 | Switzer et al. | 370/254 |
| 2006/0221915 A1 * | 10/2006 | Gatta et al. | 370/338 |
| 2006/0246947 A1 * | 11/2006 | Fujii et al. | 455/557 |
| 2006/0268806 A1 * | 11/2006 | Meier et al. | 370/338 |

(Continued)

*Primary Examiner* — Hoang-Chuong Vu (74) *Attorney, Agent, or Firm* — Forefront IP Lawgroup, PLLC (57) ABSTRACT

Various embodiments provide simplified methods and apparatuses for creating and administering an independent basic service set, or ad hoc wireless cell. A user is presented with a unified user experience that reduces the time and expertise required to utilize the independent basic service set functionality.

16 Claims, 7 Drawing Sheets

(56) References Cited

U.S. PATENT DOCUMENTS

| | | |
|---|---|---|
| 2007/0033257 A1* | 2/2007 | Nakajima et al. ............. 709/206 |
| 2007/0133439 A1* | 6/2007 | Promenzio et al. ........... 370/261 |
| 2007/0141988 A1* | 6/2007 | Kuehnel et al. .............. 455/41.2 |
| 2007/0168553 A1* | 7/2007 | Jones et al. .................... 709/245 |
| 2007/0299914 A1* | 12/2007 | Jones et al. .................... 709/205 |
| 2008/0031209 A1* | 2/2008 | Abhishek et al. ............. 370/338 |
| 2008/0065751 A1* | 3/2008 | Hampson ...................... 709/223 |
| 2008/0101315 A1* | 5/2008 | Bachmutsky .................. 370/342 |
| 2008/0112364 A1* | 5/2008 | Kwon et al. ................... 370/331 |
| 2008/0123558 A1* | 5/2008 | Chhabra ........................ 370/254 |
| 2009/0051498 A1* | 2/2009 | Otranen ........................ 340/10.4 |
| 2009/0111532 A1* | 4/2009 | Salokannel et al. ........... 455/574 |
| 2009/0327713 A1* | 12/2009 | Marin et al. ................... 713/168 |
| 2010/0260061 A1* | 10/2010 | Bojahra et al. ................ 370/252 |
| 2010/0278077 A1* | 11/2010 | Reunamaki et al. ........... 370/254 |
| 2011/0134847 A1* | 6/2011 | Smetters et al. .............. 370/328 |

\* cited by examiner

METHOD AND APPARATUS FOR CREATING AND CONNECTING TO AN AD HOC WIRELESS CELL

BACKGROUND

With the proliferation of electronic computing and communication devices has come the need for such devices to communicate and exchange data. Traditional wired networks have addressed this need by enabling connected devices to communicate with the network and with each other. Wired networks are limited, however, in that a device must have a wire connection to the network in order to utilize the network to communicate and exchange data. Thus, a device may only connect to such a network at specific locations that have been provided with wire connections to the network.

To address this limitation of traditional wired networks, the wireless network was developed. Wireless networks allow devices with wireless capability to connect to the network and to utilize the network to communicate and exchange data, without the requirement of a wire connection to the network. Instead, the connection to the wireless network is made via the transmission and reception of electromagnetic waves (e.g. radio waves and/or microwaves).

The vast majority of wireless networks utilize some type of wireless access point (WAP) to enable wireless devices to connect to the network. In most instances, a WAP acts as a central hub to receive wireless transmissions from wireless devices and to connect the wireless devices to a traditional infrastructure wired network. While the use of WAPs is increasing, there are still many locations where, due to the physical limitations inherent in broadcasting and receiving radio waves, connection to a WAP is not possible. Further, there are instances where connection to a WAP is not desirable due to security concerns or the requirement of registering a device with a wireless network. Accordingly, there are instances and locations where connection to a network is not possible due to the absence of either a wired network or a satisfactory wireless network.

Notwithstanding the inability in certain situations to connect to a traditional infrastructure network, wireless devices may utilize an independent basic service set (IBSS), also known as an ad hoc cell, to engage in wireless communication with each other. An IBSS allows devices with wireless capability to exchange wireless signals with other wireless devices, in the absence of a traditional WAP or infrastructure network. This is achieved through the creation of an ad hoc wireless cell. However, the setup of an IBSS is a complex process that requires the user to manually enter multiple operational parameters, including the assignment of IP addresses for devices that desire to associate with the IBSS. This complexity, combined with the network knowledge required to create an IBSS, has deterred potential users from utilizing this functionality.

DETAILED DESCRIPTION

In various embodiments described below, systems and methods are described for the simplified setup and administration of an independent basic service set (IBSS), also known as an ad hoc wireless cell (these terms are used interchangeably herein). By utilizing an IBSS, a wireless cell can be created in the absence of a traditional infrastructure network. Thus, by creating an IBSS cell, two or more wireless-enabled devices can communicate and exchange data with each other. A wireless-enabled device can include, by way of example and not limitation, a cell phone, a laptop, a portable digital assistant, or any other device capable of being configured to transmit and/or receive wireless signals.

In some embodiments, the discussed systems and methods are based on the 802.11 wireless standards, which provide wireless local access network medium access control and physical layers specifications. See, e.g., ANSI/IEEE 802.11 standard, first edition 1999, and its subsequent amendments. Thus, in some embodiments, the discussed systems and methods serve as additions to and expansions of the 802.11 standards.

The discussion below will proceed as follows. First, an exemplary environment in which an IBSS cell may be utilized will be discussed. Following this, an exemplary IBSS cell creation wizard is discussed. Next, an exemplary method for creating an IBSS cell is presented. Following this, an exemplary method for joining an existing IBSS cell is discussed. Further, an exemplary method is presented for disconnecting from an IBSS cell and/or reassigning the IBSS cell initiator. Finally, an exemplary electronic system that can utilize an IBSS cell is discussed.

Exemplary IBSS Environment

Figure 1:
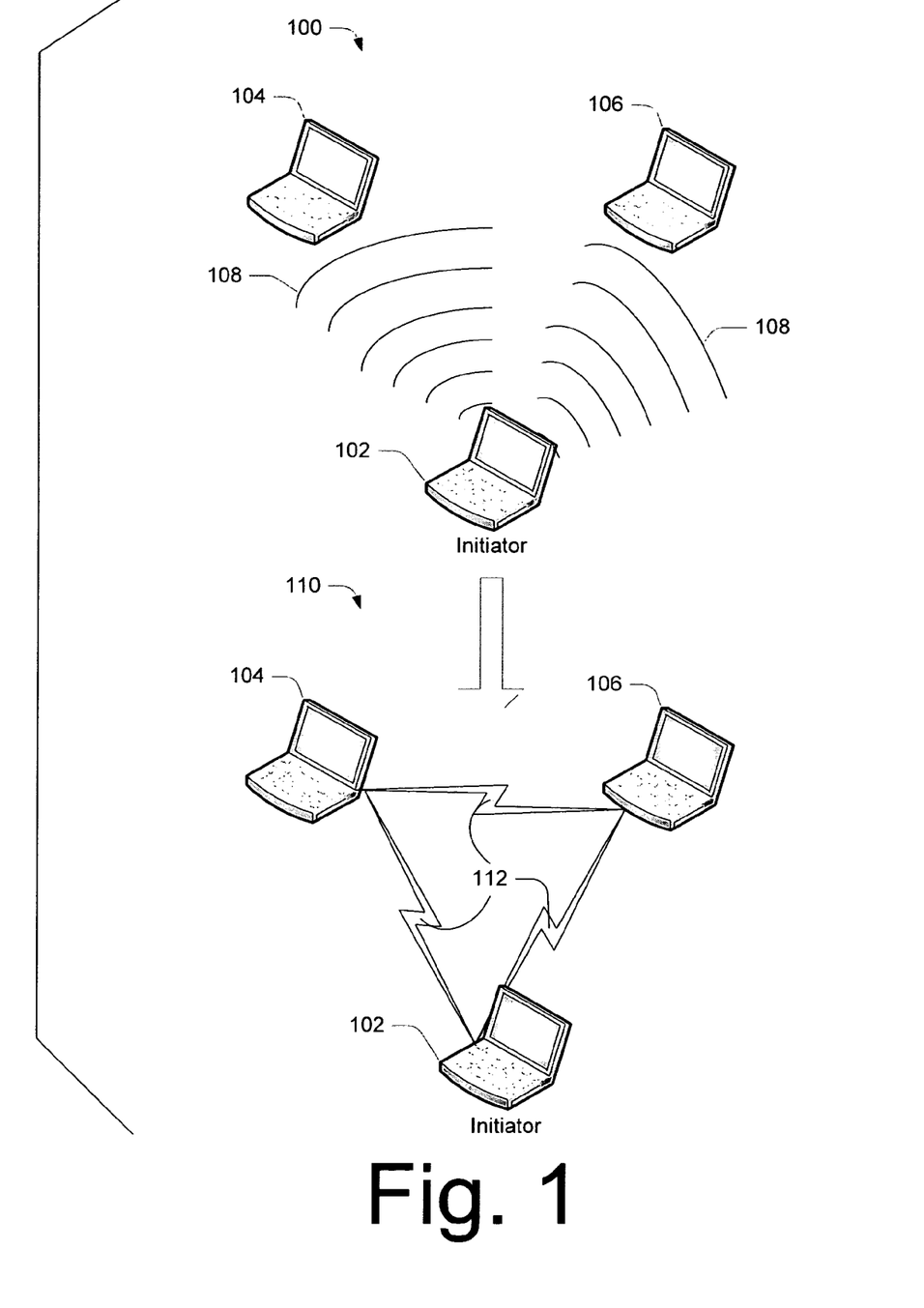
FIG. 1 illustrates an exemplary wireless cell environment.

With reference to FIG. 1, an exemplary environment in which an IBSS cell may be utilized is shown generally at 100. In this example, a wireless-enabled initiator 102 creates an IBSS cell and begins advertising the cell by transmitting a signal 108 (e.g via radio waves) that may be detected by other wireless-enabled devices. Further to this example, wireless-enabled devices 104 and 106 are within reception range of the initiator's signal and thus are capable of detecting the signal. While the wireless-enabled devices used in this illustration are laptop computers, this is not intended to be limiting, and any suitable wireless-enabled device may be utilized to create and/or associate with an IBSS cell.

The environment of 100 is shown generally at 110 and illustrates that wireless-enabled devices 104 and 106 have elected to associate with the IBSS cell, and thus communications link 112 has been established between wireless-enabled devices 102, 104 and 106. In contradistinction to the standard access point architecture of a typical wireless infrastructure network, the creation of an IBSS cell results in a communications link between and among all of the associated cell members. Thus, with the establishment of communications link 112, each of wireless-enabled devices 102, 104 and 106 are capable of sending data to and receiving data from each of the other members of the IBSS cell. While FIG. 1 illustrates an IBSS cell comprising three wireless-enabled devices, this is not intended to be limiting, and an IBSS cell may contain any suitable number of wireless-enabled devices.

Exemplary IBSS Cell Creation Wizard

Figure 2:
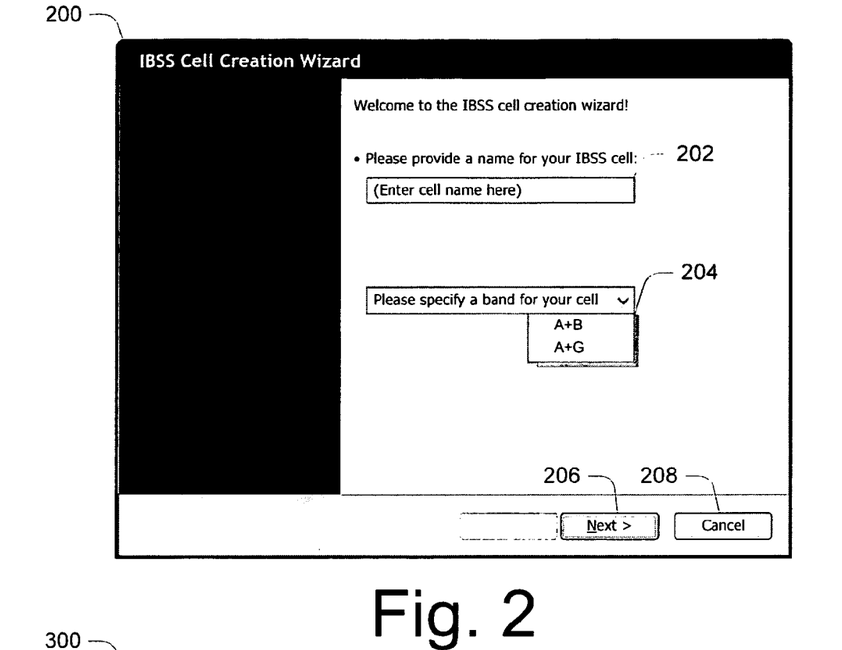
FIG. 2 illustrates an exemplary opening screen in one embodiment of an IBSS cell creation wizard
Figure 3:
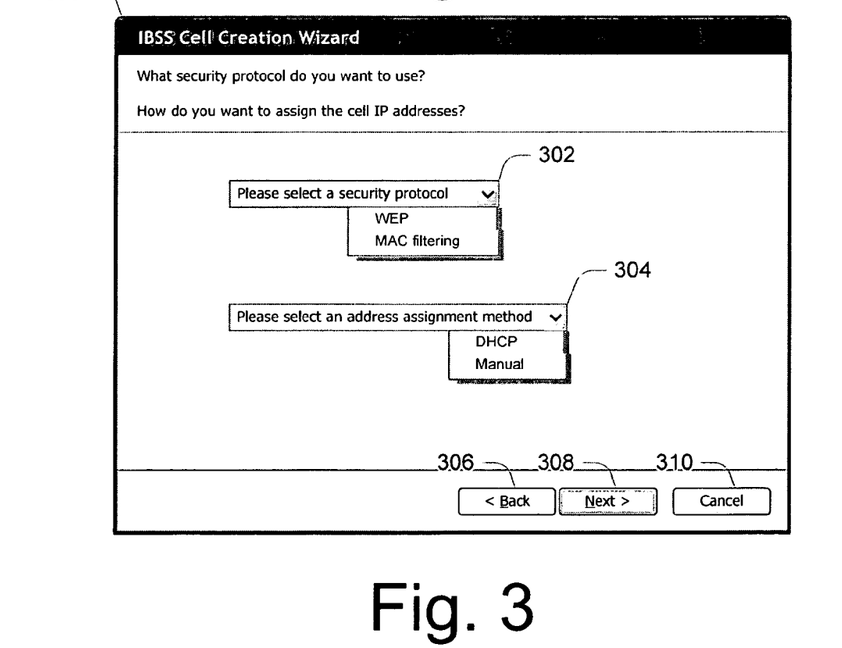
FIG. 3 illustrates an exemplary intermediate screen in one embodiment of an IBSS cell creation wizard.
Figure 4:
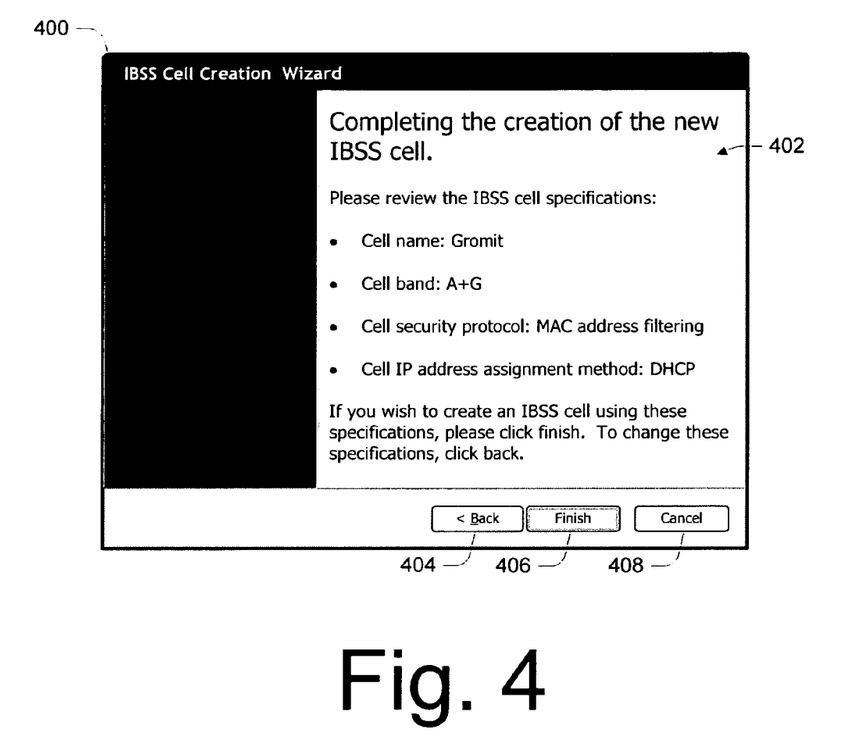
FIG. 4 illustrates an exemplary summary screen in one embodiment of an IBSS cell creation wizard.

In FIGS. 2-4, interface screens from an exemplary IBSS cell creation wizard in accordance with one embodiment are illustrated. These examples are presented for purposes of illustration only and, according to various embodiments, an IBSS cell creation wizard may utilize any suitable configuration that permits the entry of IBSS cell specifications.

In FIG. 2, an exemplary IBSS cell creation wizard introductory screen or user interface is shown at 200. In some embodiments, screen 200 may be displayed in response to a user activating an IBSS cell creation wizard icon. However, this is not intended to be limiting, and screen 200 may be displayed according to other activation scenarios. An interface portion or field 202 prompts the user to enter a name for the IBSS cell. An interface portion or field 204 prompts the user to select a band or bands on which the IBSS cell will operate. The use of the band options "A+B" and "A+G" in this example refers to the bands utilized by the corresponding 802.11 wireless standards (i.e. the 802.11b, 802.11a, and 802.11g standards). The illustrated bands are used for purposes of example only, and other suitable bands that may be utilized are well known to those of skill in the art.

In this example, an interface portion 206 in the form of a "next" button is displayed and allows the user to transition to a subsequent screen in the IBSS cell creation wizard. An interface portion 208 in the form of a "cancel" button is displayed and allows a user to cancel the creation of the IBSS cell and exit the wizard.

FIG. 3 illustrates at 300 an exemplary intermediate screen or user interface of an IBSS cell creation wizard in accordance with one embodiment. An interface portion or field 302 prompts a user to select a security protocol or protocols under which the IBSS cell will operate. The example illustrated here presents the user with the security options of wired equivalent privacy (WEP) or media access control (MAC) address filtering. These security options are presented for purposes of illustration only, and other security techniques and protocols may be utilized without departing from the spirit and scope of the claimed subject matter. An interface portion or field 304 prompts the user to select an IP address assignment method. The selected method will be utilized to assign IP addresses to wireless-enabled devices that wish to join the IBSS cell. In this example, the IBSS cell creation wizard gives a user the option of choosing dynamic host configuration protocol (DHCP) or manual IP address assignment. However, the use of these examples is not meant to be limiting, and other suitable methods for allocating IP addresses may be employed within the spirit of the disclosed embodiments.

An interface portion 306 in the form of a "back" button is displayed and, if actuated, allows a user to return to a previous wizard screen. An interface portion 308 in the form of a "next" button allows a user to transition to a subsequent screen in the IBSS cell creation wizard. Finally, an interface portion 310 in the form of a "cancel" button is provided and, if actuated, gives the user the option of canceling the creation of the IBSS cell and exiting the IBSS cell wizard.

FIG. 4 presents at 400 an exemplary summary screen or user interface of an IBSS cell creation wizard in accordance with one embodiment. An interface portion 402 lists a summary of the IBSS cell specifications that may be used to create an IBSS cell. This summary may contain IBSS cell specifications that were selected or specified by the user, while other listed IBSS cell specifications may be default values that were not expressly specified by the user. The cell specifications listed in this example (e.g. cell name "Gromit", cell band "A+G", etc.) are for purposes of illustration only, and are not intended to be limiting. An interface portion 404 in the form of a "back" button is presented and allows a user to transition to a previous screen in the IBSS cell creation wizard. An interface portion 406 in the form of a "finish" button is presented and, if actuated, indicates that the user accepts the IBSS cell specifications and desires to create an IBSS cell based on these specifications. Finally, an interface portion 408 in the form of a "cancel" button gives a user the option of canceling the creation of the IBSS cell and exiting the IBSS cell creation wizard.

The diagrams discussed above constitute but one example of a single user interface type that can be utilized to create an IBSS cell. It is to be appreciated that other user interface types can be used without departing from the spirit and scope of the described embodiments.

Exemplary Methods

Figure 5:
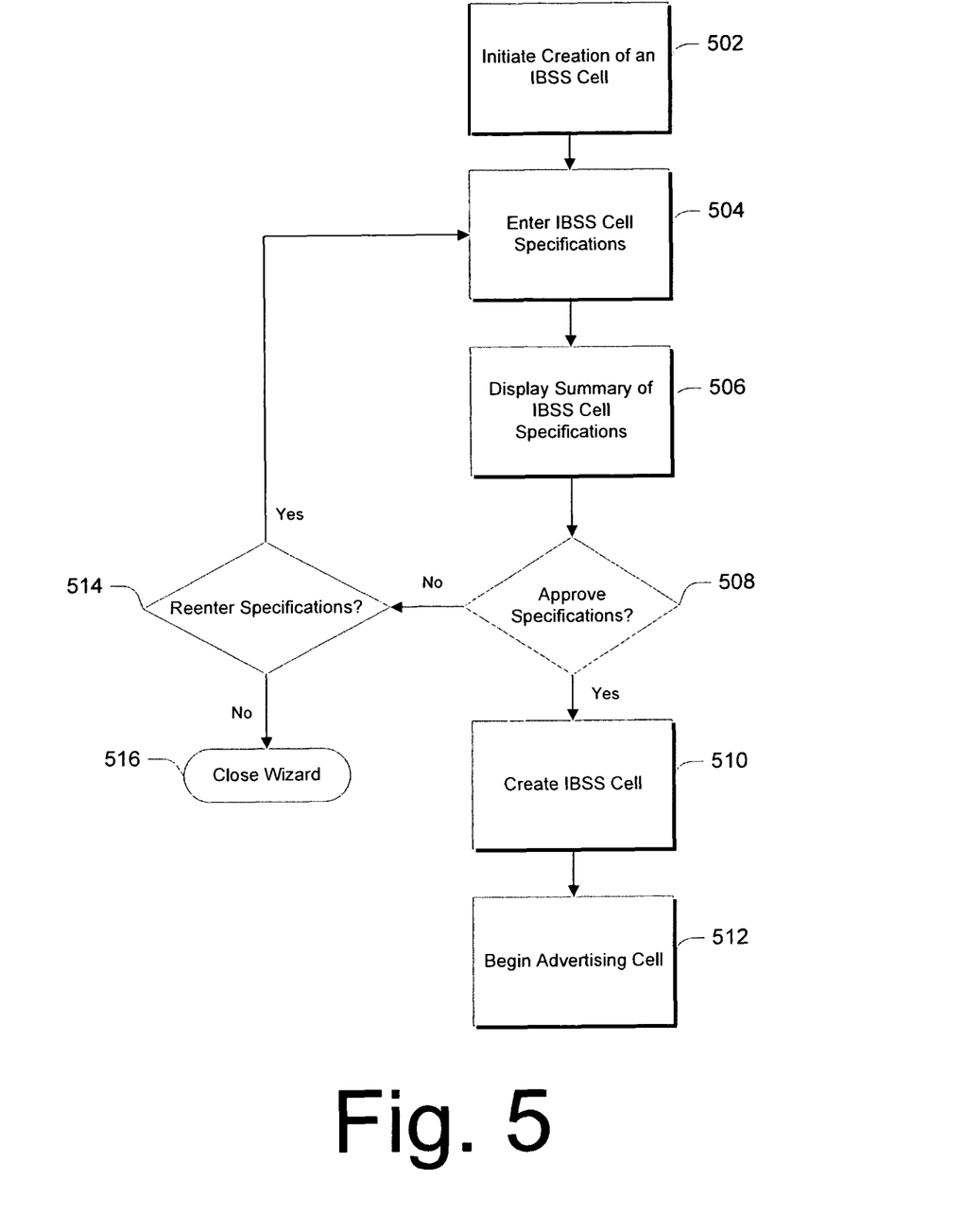
FIG. 5 presents a flow diagram illustrating a method for creating a wireless cell in accordance with one embodiment.

FIG. 5 is a flow diagram that illustrates an exemplary method for creating an IBSS cell in accordance with one embodiment. The method can be implemented in connection with any suitable hardware, software, firmware or combination thereof. In at least some embodiments, the method is implemented in software in the form of computer-readable instructions that reside on a computer-readable medium.

At 502, a user initiates the creation of an IBSS cell. This act may be accomplished by pressing a corresponding icon displayed on the user's wireless-enabled device, or by any other suitable means for invoking such a method. In some embodiments, act 502 may cause a user interface to be displayed. At 504, the user enters specifications that may be used, at least in part, to create the IBSS cell. In some embodiments, the specifications entered in act 504 may be input via a user interface. At act 506, a summary of IBSS cell specifications is presented to the user. In some embodiments, this act may take the form of a list of IBSS cell specifications graphically displayed to the user. At 508, the user is given the option of approving one or more IBSS cell specifications. If the user approves the proffered specifications, act 510 then creates or initiates the IBSS cell based at least in part on the approved specifications. Act 512 then begins advertising the IBSS cell by transmitting a beacon that includes, at least in part, an IBSS cell information element (CIE). A CIE is an information-containing data packet that, in some embodiments, allows other wireless-enabled devices to detect an available IBSS cell. In accordance with one embodiment, a CIE may have the following data fields:

TABLE 1

| Field | Size (in octets) | Value | Description |
| --- | --- | --- | --- |
| Element ID | 1 | | Information element ID - identify the IE as a part of a certain IE family (for example Cisco measurements IE) |
| Length | 1 | | The length (in bytes) of the IE |
| OUI | 3 | | Organizationally Unique Identifier - meaning that this IE is a part of a protocol that belongs to a certain organization |
| OUI type | 1 | | Defines this IE as a part of a certain feature or protocol that belongs to the organization above (in the OUI) |
| Subtype | 1 | | Defines the exact purpose of this IE (for example client, access point, etc) |
| Reserved | | | |
| Initiator MAC | 6 | | Media Access Control (MAC) Address of the IBSS cell initiator |
| IP list start | | | The beginning of the IP address scope assigned by the initiator to the joiners |

TABLE 1-continued

| Field | Size (in octets) | Value | Description |
|---|---|---|---|
| IP list end | | | End of the IP address list above |
| Assigned IP list element | 5 | | A list containing all the assigned IP address (that cannot be assigned again) |

The listing of these particular data fields is not intended to be limiting, and other CIEs may contain differing amounts and types of data fields.

Referring back to act 508, if a user indicates that the user does not approve the proffered specifications, act 514 then gives the user the option of reentering one or more IBSS cell specifications. If the user chooses to reenter the specification(s), the user is returned to act 504. If the user chooses not to reenter the specification(s), act 516 terminates the creation of the IBSS cell and, in some embodiments, closes any open IBSS cell creation interface.

Figure 6:
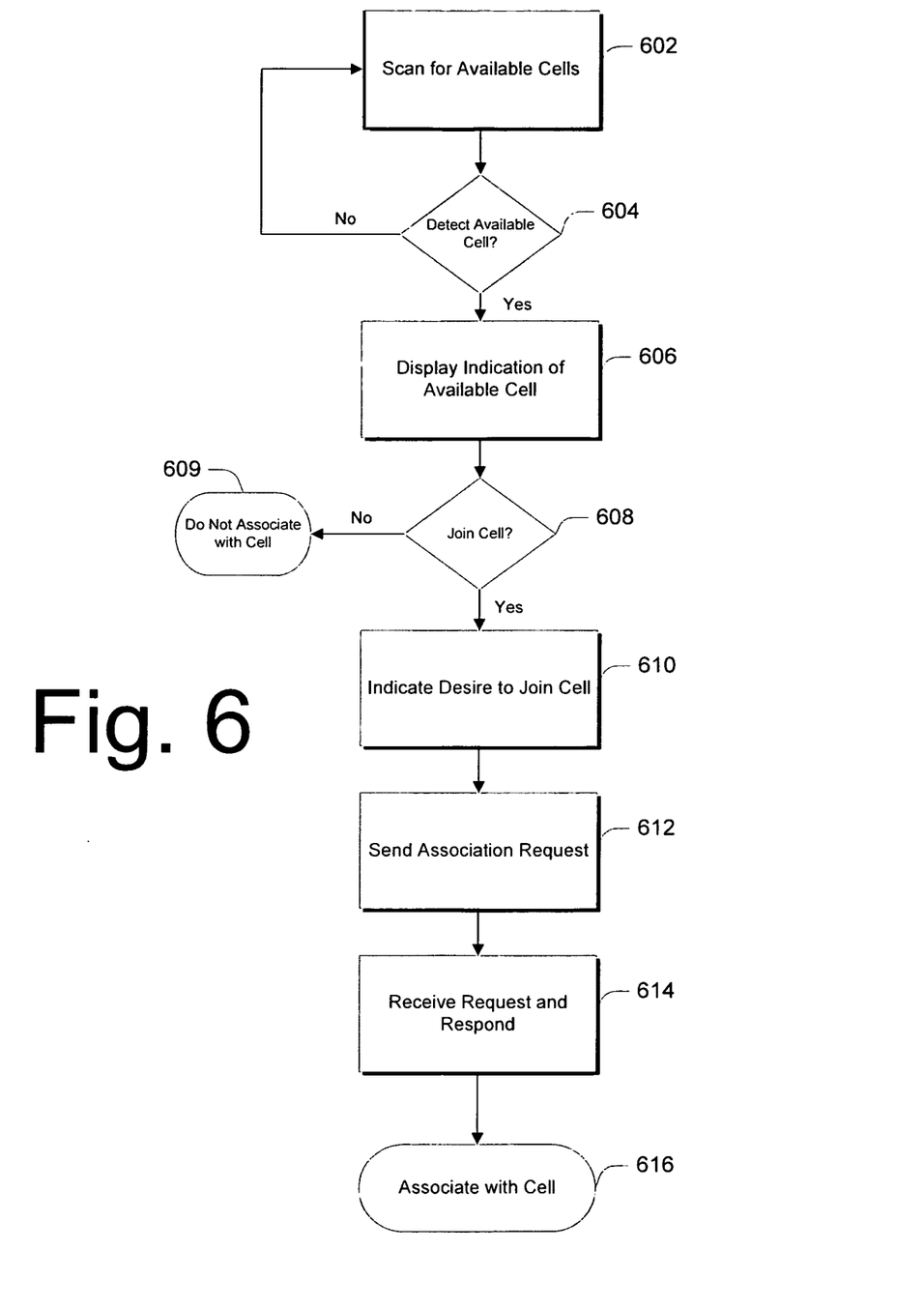
FIG. 6 presents a flow diagram illustrating a method for joining a wireless cell in accordance with one embodiment.

FIG. 6 is a flow diagram that illustrates an exemplary method for associating with an IBSS cell in accordance with one embodiment. The method can be implemented in connection with any suitable hardware, software, firmware or combination thereof. In at least some embodiments, the method is implemented in software in the form of computer-readable instructions that reside on a computer-readable medium.

At 602, a wireless-enabled device scans for any available IBSS cell(s). In some embodiments, this scan may be periodic in nature or, in alternate embodiments, may consist of a continuous scan. Other modes of scanning may be employed without departing from the spirit and scope of the described embodiments. At 604, the wireless-enabled device determines whether or not an available IBSS cell has been detected. If an available IBSS cell has not been detected, then the method returns to act 602 and continues scanning for available IBSS cells. While not expressly illustrated here, other embodiments may cease scanning for available IBSS cells after failing to detect an available IBSS cell at act 604.

If an available IBSS cell is detected at act 604, then act 606 displays an indication of the available cell(s). Any suitable indication can be used. At 608, the user is given the option of joining the IBSS cell. If the user indicates a desire not to join the IBSS cell, either expressly or impliedly, then, as indicated at 609, the user is not associated with the cell. If the user desires to join the IBSS cell, then the user so indicates at act 610. At act 612, the user then sends an association request to the initiator of the IBSS cell. In some embodiments, the transmitted association request includes an association information element (AIE) that is sent to the initiator of the IBSS cell. The primary purpose of the AIE is to notify the initiator of the IBSS cell that a wireless-enabled device desires to associate with the IBSS cell. An exemplary AIE may contain the data fields listed below in table 2. However, the inclusion of this table is not intended to be limiting, and other AIEs may contain different amounts and types of data fields.

TABLE 2

| Field | Size (in octets) | Value | Description |
|---|---|---|---|
| Subnetwork Access Protocol (SNAP) header | 8 | | proprietary inter-access point protocol (IAPP) frame |
| IAPP ID & Length | 2 | | 0 indicates this is a IAPP control frame |
| IAPP Type | 1 | <TBD> | Indicates this is AIE |
| IAPP Subtype | 1 | 0x01 | Request frame |
| Destination MAC address | 6 | xx:xx:xx:xx:xx:xx | MAC address of requesting user |
| Source MAC Address | 6 | xx:xx:xx:xx:xx:xx | Initiator MAC address |

At 614, the initiator receives the AIE and responds by sending a response information element (RIE) to the requesting device. The primary purpose of the RIE is to provide the requesting device with an IP address that will allow the requesting device to associate with the IBSS cell. If the initiator grants the association request, the RIE will contain a valid IP address. An exemplary RIE may contain the following data fields, as illustrated below in table 3. The data fields illustrated in table 3 are for purposes of example only, and other RIEs may contain different amounts and types of data fields.

TABLE 3

| Field | Size (in octets) | Value | Description |
|---|---|---|---|
| SNAP header | 8 | | proprietary IAPP (inter-access point protocol) frame - meaning this frame is a propriety frame that was approved to be used (i.e. was standardized) |
| IAPP ID & Length | 2 | | 0 indicates this is a IAPP control frame |
| IAPP Type | 1 | <TBD> | Indicates this is RIE |
| IAPP Subtype | 1 | 0x02 | Respond frame |
| Destination MAC address | 6 | xx:xx:xx:xx:xx:xx | Medium Access Control layer address of the addressed station (can be a specific address or FF:FF:FF:FF:FF - meaning that this is a multicast) |
| Source MAC Address | 6 | xx:xx:xx:xx:xx:xx | Medium Access Control layer address of the sending station |
| Assigned IP address | | | The station IP address |

In some embodiments, if the initiator does not grant the request, the RIE will contain a null IP address. In alternate embodiments, the initiator will simply not return an RIE, thereby preventing the requesting device from receiving and IP address from the initiator. If the initiator grants the association request and provides or assigns a valid IP address, the requesting device is associated with the cell at 616. In some embodiments, act 616 may include transmitting to the initiator, by the associating device, a notification that the specific IP address provided by the initiator has been accepted by the requesting device and is being used by the requesting device to associate with the IBSS cell. After sending the RIE with the IP address, the initiator will update the IP list element in the beacon to indicate that the IP address is not currently available.

Figure 7:
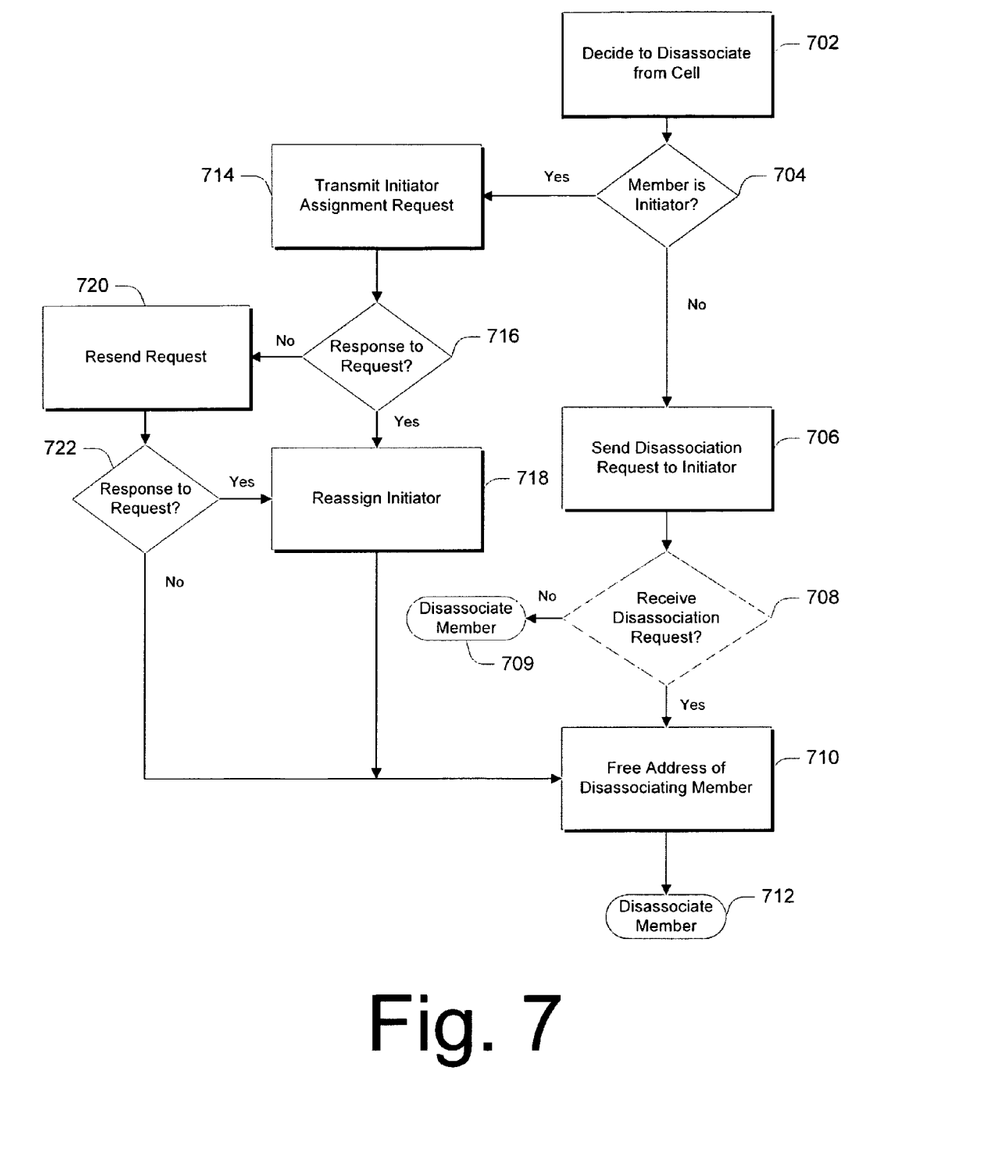
FIG. 7 presents a flow diagram illustrating a method for disassociating from a wireless cell in accordance with one embodiment.

FIG. 7 illustrates an exemplary method for disassociating a member from an IBSS cell in accordance with one embodiment. The method can be implemented in connection with any suitable hardware, software, firmware or combination thereof. In at least some embodiments, the method is implemented in software in the form of computer-readable instructions that reside on a computer-readable medium.

At 702, a member of an IBSS cell decides to disassociate from the IBSS cell. At 704, a determination is made as to whether the member requesting disassociation is the initiator of the IBSS cell. If the requesting member is not the initiator, then a disassociation request is sent by the requesting member to the initiator at 706. A disassociation request is a data packet that contains specific data fields, as illustrated below in table 4. The data fields listed in table 4 are for purposes of illustration only, and other disassociation requests may contain different amounts and types of data fields.

TABLE 4

| Field | Size (in octets) | Value | Description |
|---|---|---|---|
| SNAP header | 8 | | proprietary IAPP frame |
| IAPP ID & Length | 2 | | 0 indicates this is a IAPP control frame |
| IAPP Type | 1 | <TBD> | Indicates this is a disassociation request |
| IAPP Subtype | 1 | 0x01 | Request frame |
| Destination MAC address | 6 | xx:xx:xx:xx:xx:xx | MAC address of initiator |
| Source MAC Address | 6 | xx:xx:xx:xx:xx:xx | MAC address of sending member |
| Assigned IP address | | | The station IP address |

At 708, a determination is made as to whether the initiator received the disassociation request. If the initiator did not receive the disassociation request, then the requesting member is disassociated at 709. If the initiator did receive the disassociation request, then the status of the requesting member's IP address is updated by freeing the address of the disassociating member at 710, thus making it available. At 712, the requesting member is disassociated from the IBSS cell.

Returning to act 704, if the member requesting disassociation is the initiator of the IBSS cell, the initiator then transmits an initiator assignment request (IAR) to one or more of the other IBSS cell members at 714. The primary purpose of the IAR is to solicit another member of the cell to take over the role of the IBSS cell initiator from the initiator requesting disassociation. An IAR is a data packet that contains specific data fields, is illustrated below in table 5. The data fields listed in table 5 are for purposes of illustration only, and other IARs may contain different amounts and types of data fields.

TABLE 5

| Field | Size (in octets) | Value | Description |
|---|---|---|---|
| SNAP header | 8 | | proprietary IAPP frame |
| IAPP ID & Length | 2 | | 0 indicates this is a IAPP control frame |
| IAPP Type | 1 | <TBD> | Indicates this is IAR |
| IAPP Subtype | 1 | 0x01 | Request frame |
| Destination MAC address | 6 | Xx:xx:xx:xx:xx:xx | MAC address of other member(s) |
| Source MAC Address | 6 | Xx:xx:xx:xx:xx:xx | MAC address of sender |

At 716, a determination is made as to whether another member of the cell has responded to the IAR. If another member of the cell is willing to assume the role of the IBSS cell initiator, then that member may transmit an initiator assignment response packet to the requesting initiator. The initiator assignment response packet contains certain data fields, as illustrated below in table 6. The data fields listed in table 6 are for purposes of illustration only, and other initiator assignment response packets may contain different amounts and types of data fields.

TABLE 6

| Field | Size (in octets) | Value | Description |
|---|---|---|---|
| SNAP header | 8 | | proprietary IAPP frame |
| IAPP ID & Length | 2 | | 0 indicates this is a IAPP control frame |
| IAPP Type | 1 | <TBD> | Indicates this is IIAR |
| IAPP Subtype | 1 | 0x01 | Response frame |
| Destination MAC address | 6 | xx:xx:xx:xx:xx:xx | MAC address of initiator |
| Source MAC Address | 6 | xx:xx:xx:xx:xx:xx | MAC address of sender |
| initiator | 1 | | 0 means that the station deny the request, 1 means the station becomes initiator |

If the initiator receives an initiator assignment response packet from another member of the cell indicating that the member is willing to assume the role of the IBSS cell initiator, then the responding member is reassigned to the role of the initiator at act 718. The reassigned initiator may then begin performing the tasks previously performed by the disassociating initiator (e.g. advertising the cell, etc.).

Referring back to act 716, if no members respond to the IAR, or if the responses received by the initiator indicate an unwillingness by the responding members to assume the role of the initiator, the initiator may resend the IAR at 720. Act 722 then determines if any members of the IBSS cell have indicated a willingness to assume the role of the IBSS cell initiator. If a member of the cell has indicated a willingness to assume the role of the initiator, then, as discussed above, the willing member is reassigned as the IBSS cell initiator at act 718. If at this point no members indicate a willingness to be the initiator, then, in some embodiments, the IP address of the initiator is indicated as available at 710 and the initiator is disassociated at 712.

In some embodiments, the failure of any other member to assume the role of the IBSS cell initiator results in a situation where the IBSS cell will operate as a legacy IBSS cell and thus there will by no initiator to provide IP addresses to joining members.

Exemplary System

Figure 8:
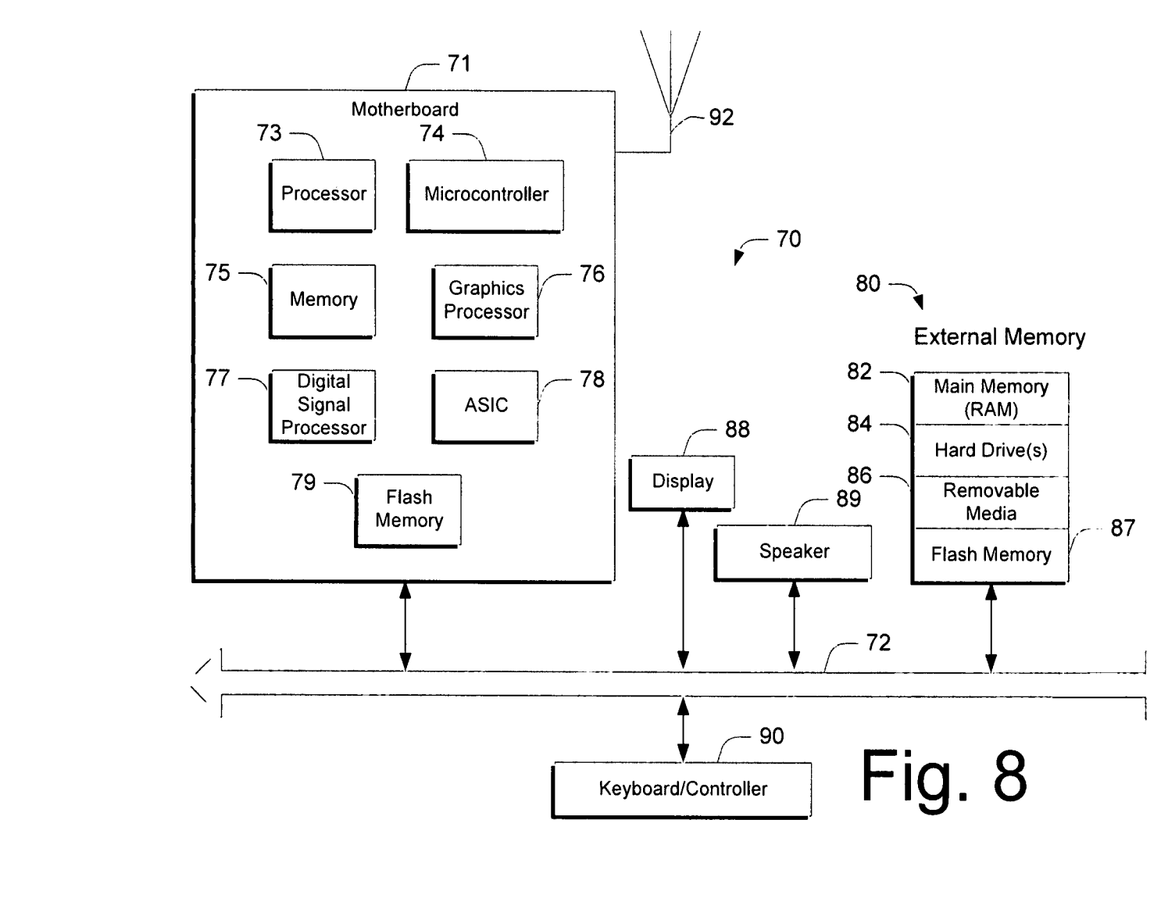
FIG. 8 illustrates an exemplary electronic system that can be utilized to implement various described embodiments.

Referring to FIG. 8, a block diagram of an exemplary electronic system that can implement various embodiments, such as those described above, is shown generally at 70. Such electronic system can comprise a computer system that includes a motherboard 71 which is electrically coupled to various components in electronic system 70 via a system bus 72. System bus 72 may be a single bus or any combination of busses.

Motherboard 71 can include, among other components, one or more processors 73, a microcontroller 74, memory 75, a graphics processor 76 or a digital signal processor 77, and/or a custom circuit or an application-specific integrated circuit 78, such as a communications circuit for use in wireless devices such as cellular telephones, pagers, portable computers, two-way radios, and similar electronic systems and a flash memory device 79.

The electronic system 70 may also include an external memory 80 that in turn includes one or more memory elements suitable to the particular application, such as a main memory 82 in the form of random access memory (RAM), one or more hard drives 84, and/or one or more drives that handle removable media 86, such as floppy diskettes, compact disks (CDs) and digital video disks (DVDs). In addition, such external memory may also include a flash memory device 87.

The electronic system 70 may also include a display device 88, a speaker 89, and a controller 90, such as a keyboard, mouse, trackball, game controller, microphone, voice-recognition device, or any other device that inputs information into the electronic system 70. The electronic system 70 may further include an antenna 92.

In accordance with the illustrated and described embodiments, software code that implements the functionality described above can reside in any of the computer-readable media of 70, e.g. memory 75, flash memory 79, and/or external memory 80.

CONCLUSION

The above-described systems and methods allow for the simplified creation of, association with, and disassociation from an independent basic service set wireless cell.

Although the embodiments have been described in language specific to structural features and/or methodological acts, it is to be understood that the subject matter defined in the appended claims is not necessarily limited to the specific features or acts described. Rather, the specific features and acts are disclosed as exemplary forms of implementing the claimed subject matter.

What is claimed is:

1. One or more non-transitory computer-readable media having computer-readable instructions thereon which, when executed by a computer, cause the computer to:
   display a wizard that allows a user to enter specifications for creating an ad hoc wireless cell;
   initiate the ad hoc wireless cell based at least in part on some of the specifications; and
   advertise the ad hoc wireless cell by transmitting a signal that allows one or more devices to detect and join the ad hoc wireless cell, wherein the initiating computer transmits an initiator assignment request (IAR) to one or more member-devices upon dis-association from the ad hoc wireless cell, the IAR includes destination Media Access Control (MAC) addresses of the one or more member-devices in the ad hoc wireless cell, wherein the signal comprises:
   a cell information element (CIE) that includes the following data fields:
   information element identifier;
   information element length;
   organizationally unique identifier;
   purpose of the information element;
   MAC address of cell initiator;
   a range, including start and end of IP addresses associated with the ad hoc wireless cell; and
   a list of Internet Protocol (IP) addresses that cannot be assigned again that further includes IP addresses that are already assigned.

2. The one or more non-transitory computer-readable media of claim 1, wherein the wizard comprises one or more fields for entering, by the user, the specifications for the ad hoc wireless cell, wherein the one or more fields include:
   a band field which allows the user to specify one or more bands for the ad hoc wireless cell; and
   an address assignment field which allows the user to select a method for assigning an IP address.

3. The one or more non-transitory computer-readable media of claim 2, wherein the one or more fields further includes:
   a cell name field which allows the user to specify a name for the ad hoc wireless cell; and
   a security field which allows the user to specify one or more security methods for the ad hoc wireless cell.

4. The one or more non-transitory computer-readable media of claim 3, wherein the wizard further comprises a summary screen, wherein the summary screen comprises a summary of the ad hoc cell specifications.

5. The one or more non-transitory computer-readable media of claim 1, wherein the transmitted signal causes one of the one or more devices to:
   detect the transmitted signal;
   display an indication of the detected signal; and
   transmit a second signal to the computer, wherein the second signal includes a MAC address of the device, and wherein the second signal causes the computer to associate the device with the ad hoc wireless cell.

6. The one or more non-transitory computer-readable media of claim 5, wherein the associating comprises assigning an IP address to the device.

7. The one or more non-transitory computer-readable media of claim 5, wherein the instructions thereon, when executed by the computer, cause the computer to:
   receive a disassociation request from the device; and
   responsive to receiving said disassociation request, disassociate the device from the ad hoc wireless cell.

8. The one or more non-transitory computer-readable media of claim 5, wherein the instructions thereon, when executed by the computer, cause the computer to:
   receive an initiator assignment response from the device, the initiator assignment response includes a MAC address of the responding device.

9. The one or more non-transitory computer-readable media of claim 8, wherein the instructions thereon, when executed by the computer, cause the computer to assign an initiator.

10. A method comprising:
    displaying a wizard that allows a user to enter specifications for creating an ad hoc wireless cell;
    initiating the ad hoc wireless cell based at least in part on some of the specifications; and
    advertising the ad hoc wireless cell by transmitting a signal to one or more devices, wherein the initiating computer transmits an initiator assignment request (IAR) to one or more member-devices upon dis-association from the ad hoc wireless cell, the IAR includes destination Media Access Control (MAC) addresses of the one or more member-devices in the ad hoc wireless cell, wherein the signal comprises a cell information element (CIE) that includes the following data fields:
information element identifier;
information element length;
organizationally unique identifier;
purpose of the information element;
MAC address of cell initiator;
a range, including start and end of IP addresses associated with the ad hoc wireless cell; and
a list of Internet Protocol (IP) addresses that cannot be assigned again that further includes IP addresses that are already assigned.

11. The method of claim 10, further comprising:
detecting by one or more devices of the transmitted signal; and
associating at least one of the one or more devices with the ad hoc wireless cell.

12. The method of claim 10, further comprising:
receiving, by the initiating computer of the ad hoc wireless cell, an initiator assignment response from the one or more member-devices of the ad hoc wireless cell, wherein the initiator assignment response includes a MAC address of the responding member.

13. The method of claim 12, further comprising assigning an initiator.

14. A system comprising:
one or more processors;
an antenna coupled to the one or more processors and configured to receive and transmit signals to enable creation of an ad hoc wireless cell;
one or more non-transitory computer-readable media; and
computer-readable instructions stored on the non-transitory computer-readable media which, when executed by the one or more processors, cause the processors to:
display a user interface to create an ad hoc wireless cell, the user interface comprising:
a cell name field which allows a user to specify a name for the ad hoc wireless cell;
a band field which allows the user to specify one or more bands for the ad hoc wireless cell;
a security field which allows the user to specify one or more security methods for the ad hoc wireless cell; and
an address assignment field which allows the user to select a method for assigning an address;
receive input from the user via the user interface;
create the ad hoc wireless cell based at least in part on the received input; and
advertise the ad hoc wireless cell by transmitting a signal that allows one or more devices to detect and join the ad hoc wireless cell, wherein the processor transmits an initiator assignment request (IAR) to one or more member-devices upon dis-association by the system from the ad hoc wireless cell, the IAR includes destination Media Access Control (MAC) addresses of the one or more member-devices in the ad hoc wireless cell, wherein the signal comprises:
a cell information element (CIE) that includes the following data fields:
information element identifier;
information element length;
organizationally unique identifier;
purpose of the information element;
MAC address of cell initiator;
a range, including start and end of IP addresses associated with the ad hoc wireless cell; and
a list of Internet Protocol (IP) addresses that cannot be assigned again that further includes IP addresses that are already assigned.

15. The system of claim 14, wherein the address assignment field allows the user to select manual assignment, by the user, of one or more of the addresses.

16. The system of claim 14, wherein the address assignment field allows the user to select automatic assignment, by one or more of the processors, of one or more of the addresses.

* * * * *